US006813125B1

(12) United States Patent
Ballard, Jr. et al.

(10) Patent No.: US 6,813,125 B1
(45) Date of Patent: Nov. 2, 2004

(54) SECONDARY GROUND FAULT PROTECTED LUMINOUS TUBE TRANSFORMER

(75) Inventors: Gerald L. Ballard, Jr., Brandon, MS (US); Eric Bobbitt, Brentwood, TN (US); Robert V. Burke, Madison, AL (US); Daoshen Chen, Sunnyvale, TX (US); Robert McCoy, Sparta, TN (US)

(73) Assignee: Universal Lighting Technologies, Inc., Madison, AL (US)

(*) Notice: Subject to any disclaimer, the term of this patent is extended or adjusted under 35 U.S.C. 154(b) by 6 days.

(21) Appl. No.: 10/187,304

(22) Filed: Jul. 1, 2002

(51) Int. Cl.[7] .................................................. H02H 9/08
(52) U.S. Cl. ........................................... 361/42; 361/43
(58) Field of Search .............................. 361/42–50, 84, 361/91, 100; 315/119, 225

(56) References Cited

U.S. PATENT DOCUMENTS 3,731,142 A * 5/1973 Spira et al. .................... 315/94
5,680,286 A * 10/1997 Pacholok ...................... 361/42
5,751,523 A * 5/1998 Ballard et al. ................ 361/42
6,111,732 A * 8/2000 Beland ......................... 361/42

* cited by examiner

*Primary Examiner*—Brian Sircus
*Assistant Examiner*—Danny Nguyen
(74) *Attorney, Agent, or Firm*—Waddey & Patterson; Larry W. Brantley

(57) ABSTRACT

A transformer assembly and method for powering a load with a secondary fault protected isolated secondary. The fault fault path is isolated from ground allowing voltage detection of faults and the return terminal is isolated from the midpoint for multiple load connection schemes using the midpoint as a ground connection. A power control system is connected between the primary winding and the input terminal with a ground fault detection circuit connected between the fault path and the ground terminal, where the ground fault detection circuit is operable to detect a fault and activate the power control system to disconnect the source of power from the primary winding in response to detecting the fault. Also disclosed is a high frequency filter adapted to reduce the effects of high frequency transients and a capacitive reactance connected between the input terminal means and the ground terminal. The capacitive reactance is adapted to provide a ground fault path for fault signals. Another improvement teaches the improved performance of an optocoupler using a breakover device for improved bias control.

11 Claims, 6 Drawing Sheets

SECONDARY GROUND FAULT PROTECTED LUMINOUS TUBE TRANSFORMER

BACKGROUND OF THE INVENTION

The present invention relates generally to transformers for powering luminous loads and more particularly, this invention pertains to secondary ground fault protection for neon tube transformers.

For luminous tube transformers presently utilized in industry, the output voltage from one output terminal to ground cannot exceed 7500V. To provide a design capable of producing output voltages in excess of 7500V, a "mid-point grounded" secondary design is employed in which two secondary coils are used. These coils produce voltages that are 180° out of phase with each other in order to develop a terminal-to-terminal voltage that is twice that measured from any one terminal to ground.

New industry regulations have been developed that require the addition of secondary ground fault protection to such designs. As noted by UL 2161 subsection 20.4 "An isolated output neon supply shall have a current to ground that is 2 milliamps or less when measured in accordance, with the Isolated Output Determination Test, Section 24A." (revised Mar. 16, 1999). Subsection 24A.1 then notes: "To determine compliance with 20.4, a neon supply is to have any protective circuitry that prevents the supply from operating without an output load connected to it disabled. The neon supply is to be connected to a source of supply adjusted to rated input with no load connected to the output. While energized, the current from each output lead or terminal to ground is to he measured. The maximum current shall not exceed 2 mA rms." (added Mar. 16, 1999). The intent is to provide a level of protection and to detect i secondary side fault to ground as a measure to reduce any potential fire hazards that may exist as a result of arcing.

As shown in FIGS. 1 and 2, mid-point grounded transformer designs 100, 200 for prior art applications are typically constructed with input terminal means 130 for receiving an input source of power, a primary winding 103 also known as a primary coil 103 with input leads 134, a core 106, at least one secondary winding 104 also known as a secondary coil 104 with output leads 136, high voltage external output terminals 132, external ground terminal 112, and chassis 1108. One endpoint 102 of each secondary coil 104 is electrically common to form a secondary midpoint 110. This secondary midpoint 110 in turn is connected to the transformer core 106. The core 106 is then connected to earth ground 114. The ends 102,1202 of the secondary coil 104 and earth ground 114 are also connected to the transformer enclosure 108, 208, if the enclosure is conductive, by a ground lead 138 providing a chassis 108 ground connection to earth ground 114. A ground wiring terminal 112 is provided on the enclosure 108 that provides a direct connection to the secondary midpoint 110 and the earth ground 114.

The luminous tube loads 116 are operated by the transformer designs 100, 200 using wiring connections 118, 218 shown in FIG. 1 and FIG. 2. FIG. 1 illustrates a "series" connection 118 of the luminous tube load 116. A possible problem with this method is that the length of conductor 120, shown is high voltage potential wiring 122, required to connect the secondary windings 104 to the tube load 116 may become excessive causing higher than acceptable leakage currents. This problem is overcome by utilizing a parallel wiring connection 218 shown in FIG. 2. in which the length of high voltage wiring 122 is minimized. Longer wiring runs are limited to the grounded conductor 124. This parallel type of wiring 218 of the luminous tube load 116 is commonly referred to as "Mid-Point Grounded" 218. More recent nomenclatures may also refer to this as a "Mid Point Wired" 218 tube load.

FIG. 3 of the drawings shows a prior design using a grounded series connected protected circuit 300. With the addition of Secondary Ground Fault Protection 302 connected between the midpoint 110 and the ground 114, the fault path 304 now passes through a sensor, shown as Secondary Ground Fault Protection 302, before connecting to ground 114. When a series tube connection 118 is employed as shown in FIG. 3, a secondary fault is detected by the Secondary Ground Fault Protection 302 by sensing the current flow on the fault path 304 from ground 114 to the coil mid-point 102.

As shown in FIG. 4, if the tubing load 116 is connected using a Mid-Point Wired parallel connection 218, the luminous tube load 116 current paths 402 are the same as a ground fault current fault path 304. With this connection, any imbalance between the current flowing from S2-to-ground and S1-to-ground, will appear as a ground fault. This would result in nuisance tripping of the Fault Protector 302.

Similarly, as shown in the series connection 118 of FIG. 5, if the high voltage transformer to tube load wiring 122 exhibits a significant amount of capacitively coupled leakage current, shown schematically as the capacitor 502, such current will appear as a ground fault. This too would result in nuisance tripping of the fault protector 302.

Finally, industry requirements dictate that a ground fault protected transformer either: (a) detect faults while chassis ground 112 is not connected to earth ground 114; or (b) shutdown transformer operation if no earth ground 114 connection is present.

In field applications, the ability to provide a reliable, low impedance earth ground 114 connection may be limited as a result of remote installation such as rooftop or pole mounted installations. The resultant high-impedance or 'noisy' ground connection can result in nuisance tripping of the fault circuit 302.

As an alternative to such protection, the transformer may utilize an isolated secondary coil design in which the output voltage does not have a measurable fixed reference to ground. A transformer or power supply of isolated design is considered to inherently provide Secondary Ground Fault Protection since there is no tendency for a "floating" voltage to seek ground. Such isolated designs are subject to fault tests in which one output is grounded. In such a fault test, the ungrounded output cannot produce a voltage in excess of 7500V. If the output does produce an output in excess of 7500V, to ground, the addition of secondary ground fault protection circuitry is required. The present invention provides an apparatus and method for providing this protection with series or mid-point wired loads. What is needed, then, is an apparatus for improved detection of fault currents in a luminous tube transformer circuit with educed false tripping. This improvement is provided by the Secondary Ground Fault Protected Neon Transformer described herein.

SUMMARY OF THE INVENTION

The present invention is designed to provide a novel transformer utilizing an isolated secondary winding design and incorporating a secondary ground fault protection circuit to provide the end user with the option of series or mid-point wired tube loads. Such a design has been proven to provide a reduction of nuisance tripping of the fault circuit as a result of capacitive coupling of output wiring, unbalanced luminous tube loads, or lamp arc transients.

The apparatus of the present invention is a transformer assembly for powering a load with a Secondary Ground Fault Protection circuit for an isolated secondary. The fault path is isolated from ground and the return terminal is isolated from the secondary midpoint for series and midpoint load connection schemes, including schemes using the midpoint as a ground connection. As an exemplary use of this isolation, a power control system is connected between the primary winding and the input terminal with the ground fault detection circuit connected in the fault path. The ground fault detection circuit is operable to detect a fault and activate the power control system to disconnect the source of power from the primary winding in response to detecting the fault.

Also disclosed is a high frequency filter adapted to reduce the effects of high frequency transients. A further aspect teaches a capacitive reactance connected between the input terminals and the ground terminal, so that the capacitive reactance an provide a ground fault path for fault signals. Yet a further improvement teaches he improved performance of an optocoupler using a breakover device for improved bias control.

Objects of the present invention include: 1) a high voltage isolated virtual midpoint return terminal, 2) integration of an isolated secondary transformer with a ground fault detection circuit; 3) integration of an isolated secondary transformer with a ground fault detection circuit while maintaining secondary isolation; 4) use of a capacitive component between line voltage supply and chassis ground to provide alternate ground fault path for fault signals; 5) use of a high frequency filter to reduce erroneous ground fault detection of transient events; 6) use of high impedance between transformer secondary windings and chassis ground to maintain isolation effect; 7) use of diac/breakover component to desensitize optocoupler performance: and 8) use of a transistor to discharge ground fault sensor filter capacitors.

DESCRIPTION OF THE PREFERRED EMBODIMENTS

Figure 6:
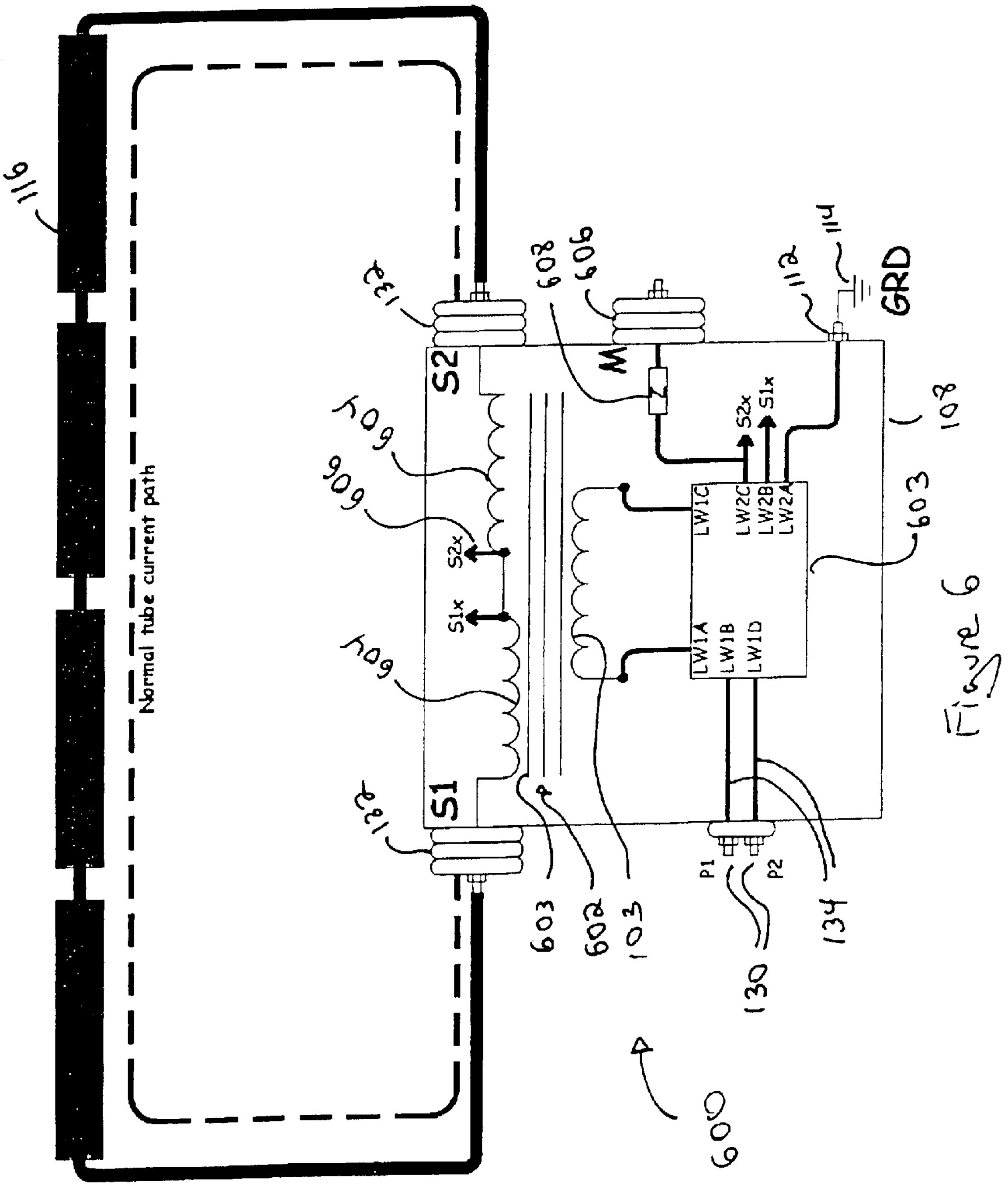
FIG. 6 is a schematic diagram of mid-point isolated luminous tube transformer with secondary ground fault protection showing an isolated mid-point return terminal in accordance with the present invention
Figure 7:
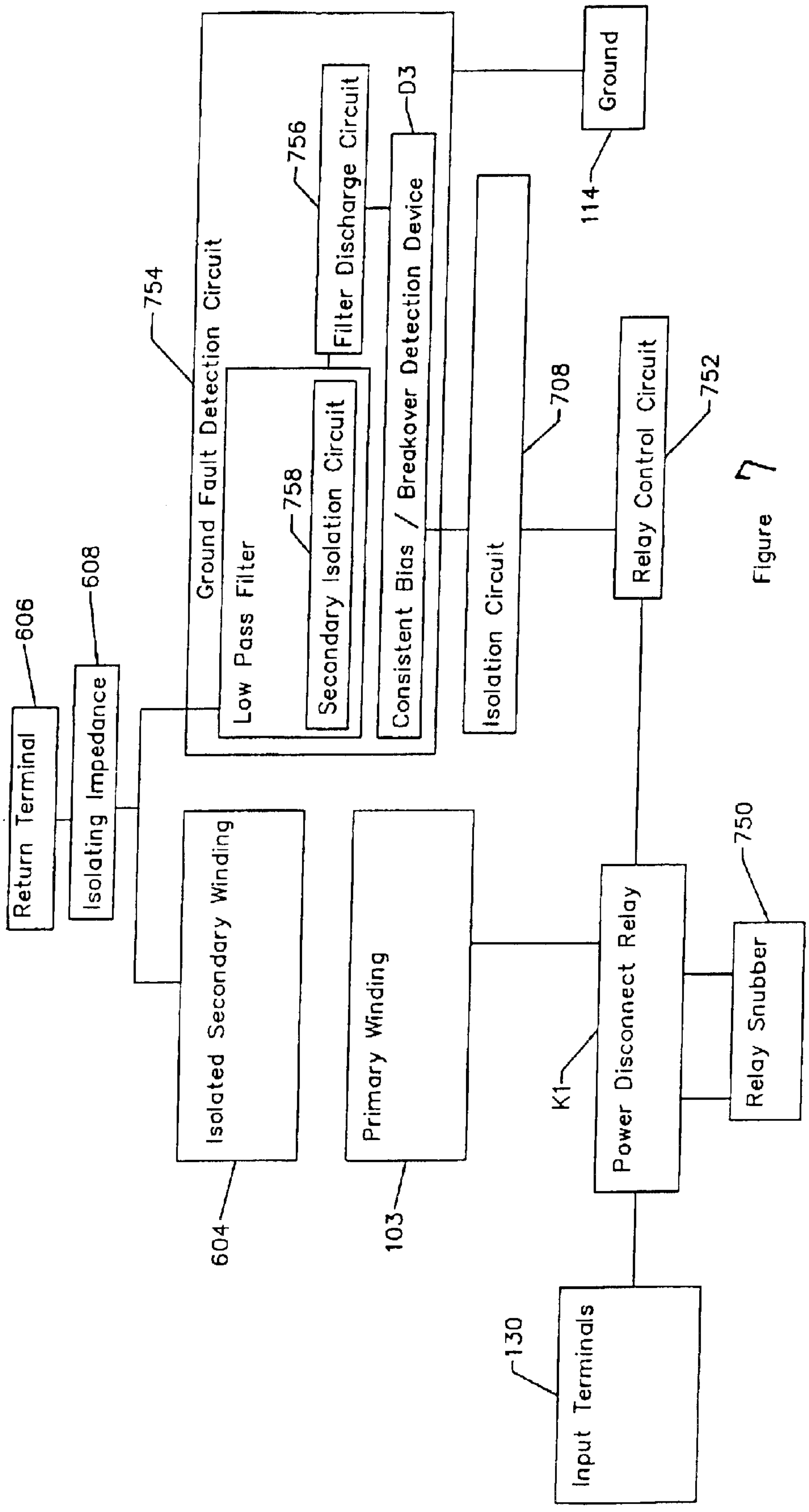
FIG. 7 is a block diagram of one embodiment of the luminous tube transformer device of FIG. 6.

The design of the secondary ground fault protected neon transformer apparatus 600, also known as an external luminous tube load powering device 600, of the present invention is illustrated in FIGS. 6 and 7. The design incorporates an isolated construction core-and-coil transformer 602 in conjunction with a high impedance fault sense detection and power control circuit 603. An additional design feature is the use of a 'virtual mid-point' terminal 606 connection.

An isolated transformer 602 with a primary winding 103, an ungrounded core 603 and at least one isolated secondary winding 604 is used. The degree of isolation of the transformer secondary 604 is evaluated prior to integration with the fault detection circuit 603. The application of a very well insulated or isolated transformer 602 is very important to the overall function of the completed design. The isolation of the secondary windings 604 insures control over the possible fault paths of any fault currents. Isolation of the secondary windings 604 also reduces capacitively coupled currents by eliminating fixed voltage-to-ground references. Additionally, use of an isolated design secondary 604 topology allows for a fault detection circuit 603 that senses a voltage differential as voltage-to-ground references between the fault path and ground rather than relying on sensing fault currents of some particular range.

The device includes external lamp terminals S1 and S2 connected to the device chassis 108. The inclusion of an external 'virtual mid-point' secondary connection also attached to the device chassis 108, also known as a midpoint terminal 606, allows the user to have alternatives in the physical wiring of luminous tube loads 116. In order to eliminate the possibility of end-user misuse of the midpoint terminal 606 by shorting it directly to ground, an isolating impedance 608 is located between the secondary winding 604 and the midpoint terminal 606. The value of the isolating impedance 608 is several orders of magnitude greater than that used in the isolation circuit 758 of fault detect sense circuit 704, shown as the parallel resistors R11 and R12 in FIG. 8. In the preferred embodiment, no actual component is used to provide the impedance. A dielectric material or air gap isolates the terminal 606 to be a free floating point.

Figure 1:
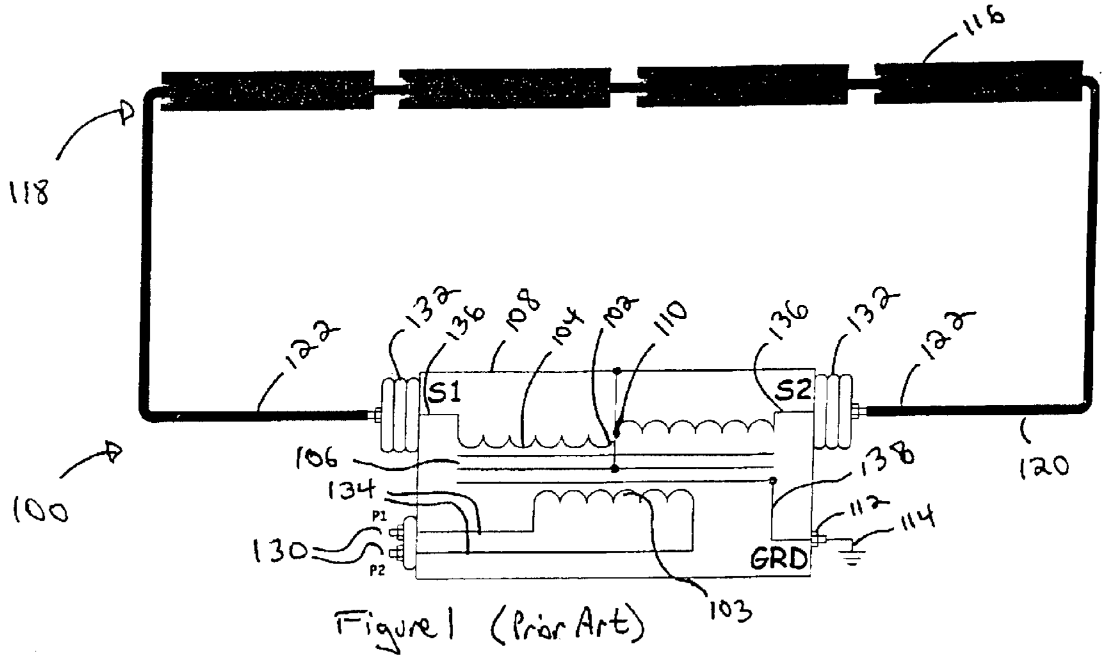
Figure 1 (Prior Art)
FIG. 1 is a conventional midpoint grounded transformer with series luminous tube connection.
Figure 2:
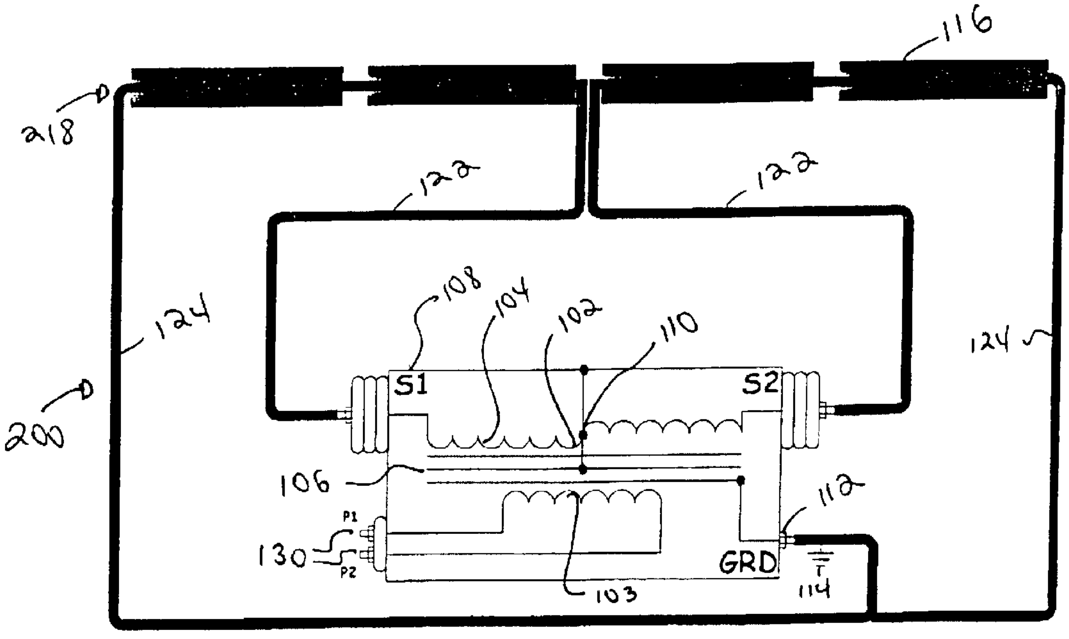
Figure 2 (Prior Art)
FIG. 2 is a conventional midpoint grounded transformer with midpoint grounded luminous tube connection.
Figure 3:
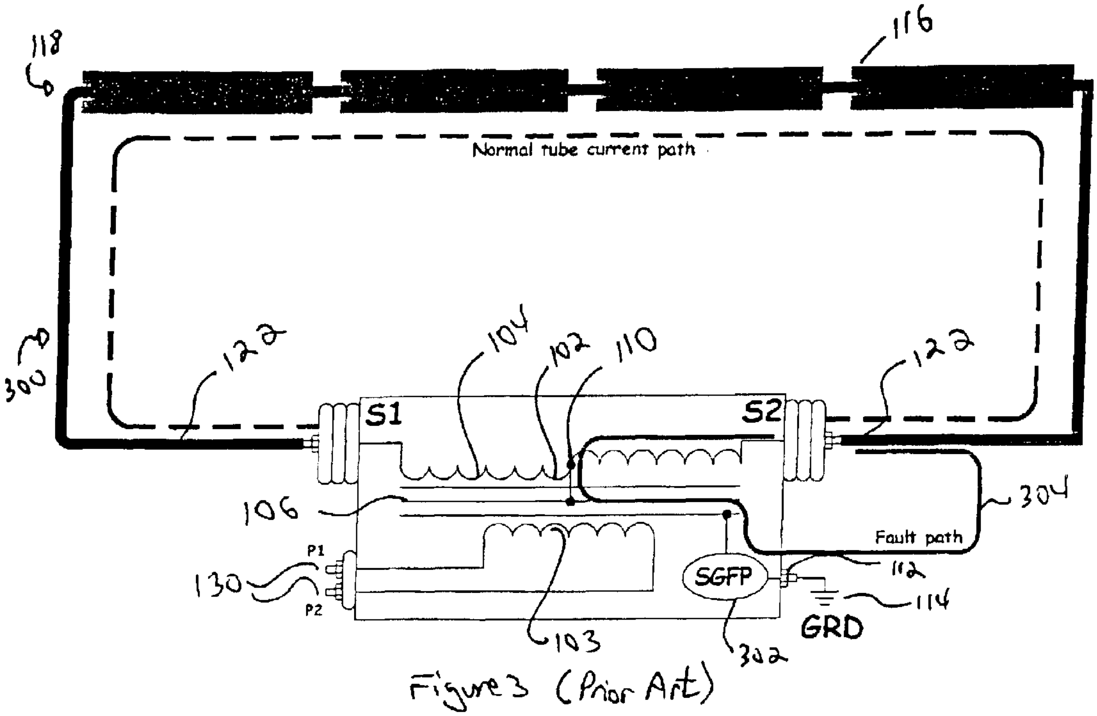
Figure 3 (Prior Art)
FIG. 3 is a conventional midpoint grounded transformer with secondary ground fault protection using a series luminous tube connection.
Figure 4:
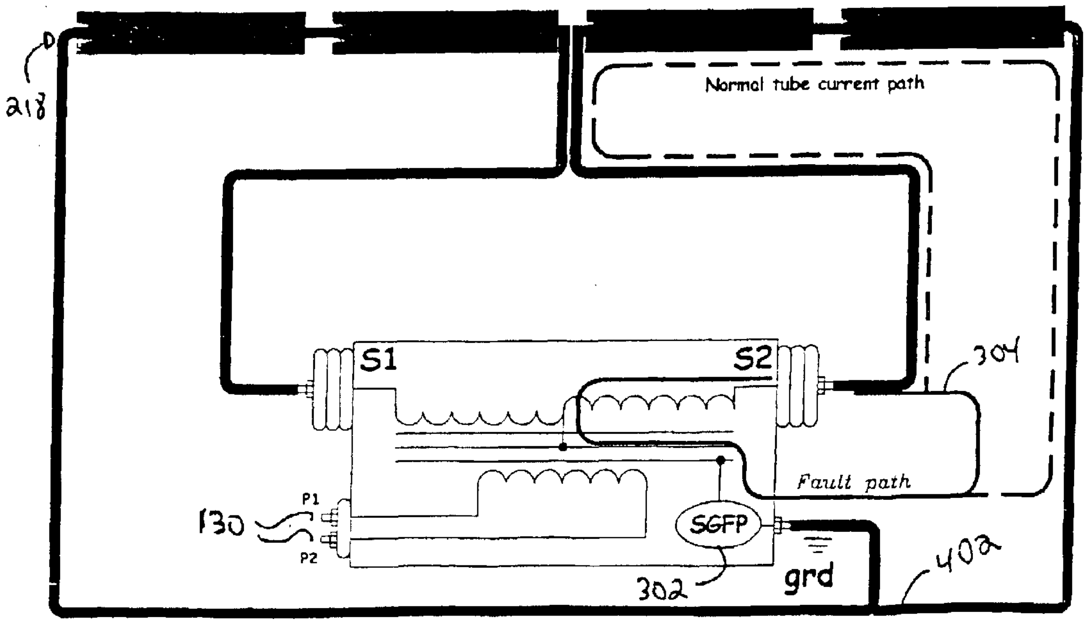
Figure 4 (Prior Art)
FIG. 4 is a conventional midpoint grounded transformer with secondary ground fault protection using a mid-point grounded luminous tube connection.
Figure 5:
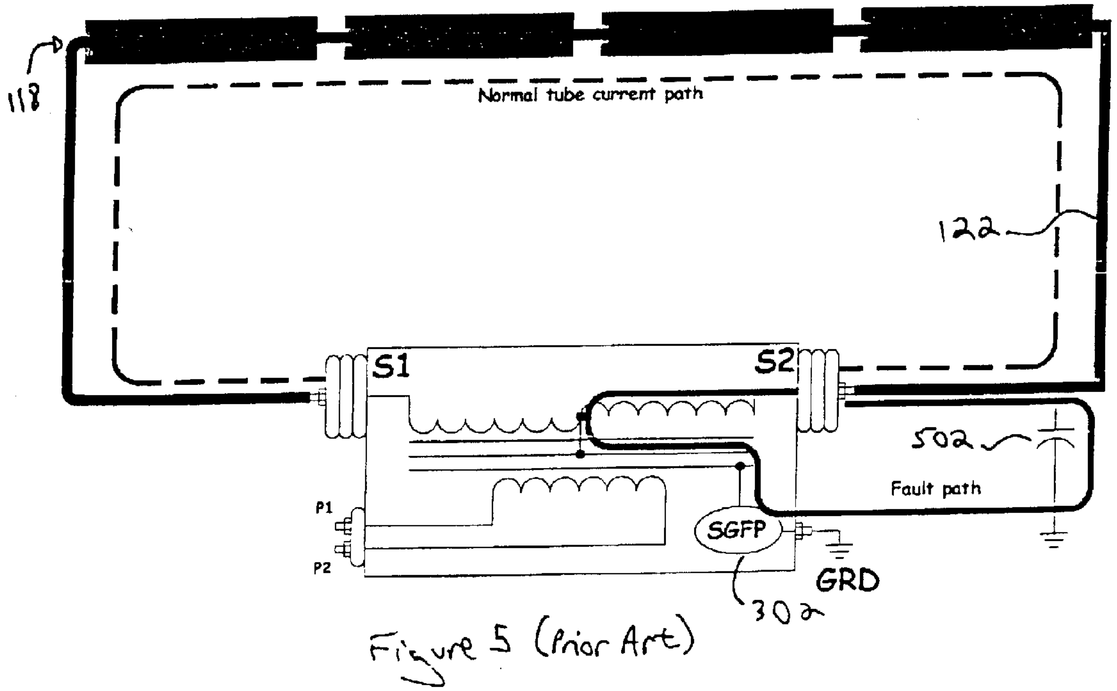
Figure 5 (Prior Art)
FIG. 5 is a conventional midpoint grounded transformer with secondary ground fault protection using a series luminous tube connection having high capacitively coupled leakage current.

Previous embodiments of ground fault sensors utilized relatively low impedances in order to maintain low voltage-to-ground differentials between the nonisolated secondary winding mid-point 110 and chassis ground 112 (FIGS. 1 and 2). The ground fault detection circuit 754 of the present invention (FIGS. 7 and 8) utilizes very high impedance components in order to restrict current flow between the isolated secondary winding midpoint terminal 606 and chassis ground 112. However, in and of itself, this is limited in its ability to establish the desired isolation for all connection schemes.

In order to retain the isolation benefits of the transformer assembly, any connection between the secondary windings 604 and chassis ground 112 should be of high impedance.

Figure 8:
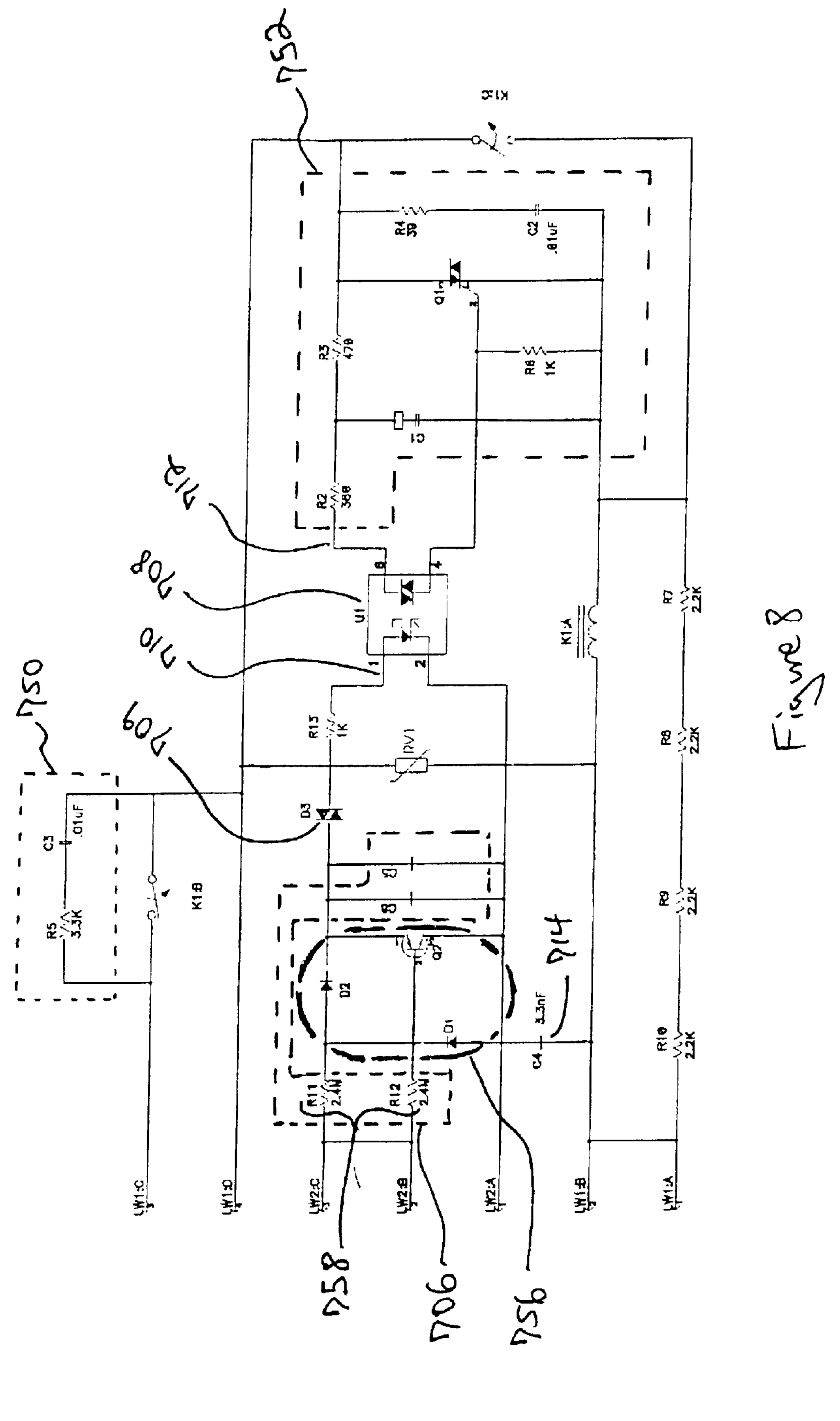
FIG. 8 is an electrical schematic of one embodiment of the secondary ground fault protection circuit and power control circuits shown in FIG. 7.

As shown in FIGS. 7 and 8, a lo-pass high frequency filter 706 (comprising R11, R12, C6, and C5) is preferably added to the secondary ground fault sense circuit 754 that serves two functions. First, the low-pass filter 706 serves to aid in reducing is any high frequency transients that could trigger the opto device 708. These transients are commonly present during each half cycle of luminous tube load 116 operation, such as during the re-strike of the arc. They may also be present in the initial startup of the luminous tube load 116, depending upon the initial phase angle of the input voltage waveform when power is first applied to the transformer 602. Additionally, the capacitors C5 and C6 (FIG. 8) in the lo-pass filter 706 serve as charge storage elements during a fault condition. If sufficient energy, due to fault currents, is developed, the resultant voltage across the capacitors C5 and C6 will be sufficient to drive the breakover voltage device 709, also known as diac D3, and allow current flow to the opto device 708.

As shown in FIG. 7 and 8, the output 710 of ground fault detection circuit 754 is electrically coupled to the input 712 of a relay control circuit 752 using an isolation circuit 708. In a preferred embodiment, the isolation circuit 708 uses an optocoupler device U1 because of the high dielectric rating between the ground fault detection circuit output 710 and relay control circuit input 712. This assures isolation between the primary 103 and isolated secondary windings 604 and/or between the isolated secondary windings 604 and ground 114. However, a limitation of the optocoupler device U1 exists in the manufacturers' ability to provide a device with a given current 'trip level' range. As a result of not having a predictable and reliable minimum current level to work with, use of a conventional opto device U1 can result in inconsistent activation levels, causing nuisance tripping as a result of system 'noise' or by not tripping at desired minimum fault current levels. The inclusion of a diac 709 (FIG. 8) as a reliable device with known breakover voltage characteristics in series with the output 710 helps in preventing 'noise' activated faults. The use of the isolated transformer 602 results in a voltage to ground sense circuit 754 that relies on a voltage levels such that the concern of minimum fault current levels no longer exists. If a ground fault occurs external to the transformer enclosure 108, a fixed voltage, reference condition is developed. This voltage is sufficient to drive the breakover device 709 into conduction and allows the opto device U1 to conduct, creating a fault signal. The breakover device 709 can be embodied in a variety of devices such as the bilateral trigger diac used in the preferred embodiment.

Any circuit design that performs transformer output shutdown based upon the absence of a very low impedance chassis 108 ground to earth ground 114 connection would likely create field performance problems. This is largely due to the difficulty associated with obtaining a quality earth ground 114 connection in a remote installation of the transformer itself. The present design uses a capacitive reactance 714 (FIG. 8) connected between the input voltage grounded conductor (LW1B on FIG. 8) to chassis ground 114 (LW2A) as a "Y-cap", with the added benefit of providing a conductive path to earth ground from chassis ground in the event that a quality chassis ground connection is not available.

The following detailed discussion of the circuit overview of FIGS. 6, 7, and 8 provides construction details for this preferred embodiment.

FIG. 7 is a block diagram of the ground fault protection circuit and power control circuits, further showing connections to the transformer and device terminals. The input terminals 130 are connected through a power disconnect relay K1 to the primary winding 103. The operation of the power disconnect relay K1 is enhanced with a relay snubber 750 and is controlled by the relay control circuit 752. The relay control circuit 752 is connected to the ground fault detection circuit 754 through an isolation circuit 708 to maintain primary to secondary isolation. The isolation circuit 708 is connected to a consistent bias breakover detection device 709 which detects the secondary faults and triggers the relay control circuit 752. The consistent bias breakover detection device 709 is connected to the secondary winding 604 through the low pass filter 706 and the secondary isolation circuit 758. The low pass filter 706 is a capacitive type of filter which may need to be discharged through the connected filter discharge circuit 756 when a non-fault charge occurs on the low pass filter such as a charge caused by normal leakage currents or lamp rectification. The secondary isolation circuit 758 provides a circuit bias that ensures isolation during load operation. The secondary isolation circuit 758 is also connected to the midpoint terminal 606 through an isolating impedance 608 to allow for the possibility for a grounded midpoint terminal 606. The secondary isolation circuit 758 is connected to the isolated secondary winding 604 to monitor the operation of the secondary windings 604 for ground faults. A detailed electrical schematic with component parameters is provided in FIG. 8.

As shown in FIGS. 6 and 7, Relay K1, shown in three parts as coil K1:A, contact K1:B, and contact K1:C, is utilized to control power delivered to the transformer primary 103 via secondary ground fault circuit output connections LW1A and LW1C. The relay control circuitry 752 operates from a 120v 60 hz source via secondary ground fault circuit connections LW1B and LW1D. These are supplied power by end user connections to terminals P1 and P2. The intent of the design is to have the common or neutral power connection made to terminal P1/LW1B. The line or hot connection should be made to terminal P2/LW1D. Series connected resistors R7, R8, R9, and R10 are used to lower the effective resistance of the relay coil shown as K1:A. Normally closed relay contact K1:B allows power to be supplied to the transformer primary 103. Normally open relay contact K1:C is used to latch the relay K1 to an on state in the event of a fault signal. The ON state of the relay K1 opens contact K1:B and disconnects power to the transformer primary 103. Components R5 and C3 serve as a snubber 750 for the relay contact K1:B. Component RV1 is utilized to suppress line transients that may damage the relay control circuit. Components R2, R3, C1, R6, Q1, R4, and C2 constitute the triac switching relay control circuit 752. Introduction of a ground fault condition activates the optocoupler U1 which is used to sense a fault signal on pins 1 and 2. Upon sensing fault current flow, the optically isolated output triac T1 of the optocoupler U1 allows current flow from pin 6 to 4. This presents a voltage to pin 2 of triac Q1 thereby energizing relay K1. As previously mentioned, this latches the relay K1 ON via contact K1:C and breaks power to the transformer primary 103 via contact K1:B. Component C4 is a high impedance "Y" cap connected between terminals LW1B and LW2A. LW2A is connected to chassis ground 112. The benefit of the C4 component in the circuit is to provide an alternate path to ground in the event that chassis ground is not connected to a reliable earth ground.

Components R11, R12, D1, D2, Q2, C5, C6, D3, R13, and U1 constitute the round fault detection circuit 754. The ground fault detection circuit 754 is connected to the transformer secondaries 604 via LW2B and LW2C. The value of components R11 and R12 in the secondary isolation circuit 758 are calculated to insure that the transformer secondaries 604 still have a high degree of isolation with respect to ground 114 under lamp load 116 conditions. In the event that a ground fault occurs in the S1-lamp-S2 current path, a fixed voltage to ground (VFAULT) will be developed at LW2B/LW2C due to the isolated construction of the transformer. VFAULT is used to drive a fault current signal through the R11/ /R12-D2-D3-R13-U1 path back to chassis ground 112. The presence of a true VFAULT is sufficient to cause the diac 709 to conduct and allow a fault current to flow through the optocoupler U1 input pins 1 and 2. The calculated value of R11 and R12 is significant because too large a value will not pass enough signal to cause 709 to conduct, and too low a value permits nuisance tripping of the circuit due to normal lamp arc transients.

In order to minimize the presence of normal operating noise signals, components CS, C6, R11, and R12 serve as a low pass filter 706 to filter out the transient voltage spikes associated with normal neon tube operation. These transients are characterized by high amplitude, short duration pulses that are effectively filtered out by the low pass filter 706.

Components CS and C6 also serve as charge storage devices for fault signals occurring during one-half of a 60 hz cycle. If an excessive amount of charge is developed, a discharge will occur through the filter discharge circuit 756 using path D3-R13-U1. To guard against any unintentional triggering as a result of charge being developed over several cycles, components for the controlled discharge switch including transistor Q2, and charge detection circuit D1, and D2 were added as a discharge circuit to discharge these unwanted charges on C5 and C6.

Thus, although there have been described particular embodiments of the present invention of a new and useful secondary ground fault protected luminous tube transformer, it is not intended that such references be construed as limitations upon the scope of this invention except as set forth in the following claims.

What is claimed is:

1. A device for powering an external luminous tube load comprising:

an device chassis;

an external ground terminal electrically connected to define a chassis ground;

input terminal means operable to receive a source of power;

a transformer mounted to the chassis, the transformer having a core, a primary winding electrically connected to the input terminal means and at least one secondary winding, the secondary winding having at least two electrical endpoints, the to transformer core and secondary endpoints being electrically isolated from the chassis ground;

at least two high voltage external output terminals electrically connectable to the luminous tube load, the high voltage external output terminals electrically connected to the secondary endpoints; and an external midpoint terminal electrically adapted to provide a midpoint wiring location for the external luminous tube load, the external midpoint terminal electrically isolated from the chassis ground and the secondary winding.

2. The device of claim 1 further comprising:

a ground fault detection circuit electrically connected between the secondary winding and the chassis ground.

3. The device of claim 2, the ground fault detection circuit comprising:

power control system electrically connected between the primary winding and the input terminal means, and a fault detection circuit electrically connected between the secondary winding and the chassis ground and operable to detect a fault and activate the power control system to disconnect the source of power from the primary winding in response to detecting the fault.

4. The device of claim 3, the ground fault detection circuit including high impedance components connected between the secondary winding and chassis ground.

5. The device of claim 2, the ground fault detection circuit operable to detect a fault as a voltage differential between the fault path and the earth ground.

6. The device of claim 2, the ground fault detection circuit adapted to maintain the isolation between the secondary winding and chassis ground to control fault current fault paths, the ground fault detection circuit operable to detect a voltage differential between the fault path and the earth ground and control the power control system to disconnect the source of power from the primary winding in response to detecting the voltage differential.

7. The device of claim 4, the ground fault detection circuit including a high frequency filter adapted to reduce the effects of high frequency transients between the secondary winding and chassis ground.

8. The device of claim 7, the high frequency filter including a chargeable element, the device further comprising:

a controlled discharge switch electrically connected to the high frequency filter, the controlled discharge switch adapted to controllably discharge unwanted charges collected in the high frequency filter.

9. The transformer apparatus of claim 8, the controlled discharge switch comprising:

a transistor controlled by a charge detection circuit.

10. The transformer apparatus of claim 1, further comprising:

a capacitive reactance connected between the input terminal means and the ground terminal, the capacitive reactance adapted to provide a ground cult path for fault signals.

11. A predictable operation coupling apparatus having a consistent operating bias and adapted to isolate an input signal from an output signal, the apparatus comprising:

an optocoupler adapted to provide electrical isolation between a coupler input and a coupler output; and a breakover component including an breakover input and a breakover output, the breakover component adapted to receive the input signal at the breakover input and provide a consistent operating bias for controlling the breakover output, the breakover output having a minimum on-signal output higher than the minimum consistent on-signal input signal necessary for operation of the optocoupler, the breakover output connected to the input signal of the optocoupler such that the breakover component and optocoupler are adapted to provide a predictable bias for operation of the optocoupler.

* * * * *